2 Sheets—Sheet 1.
W. P. BYLER.
COMBINED CORN PLANTER, SOWER, REVOLVING HARROW, AND CULTIVATOR
No. 74,496. Patented Feb. 18, 1868.
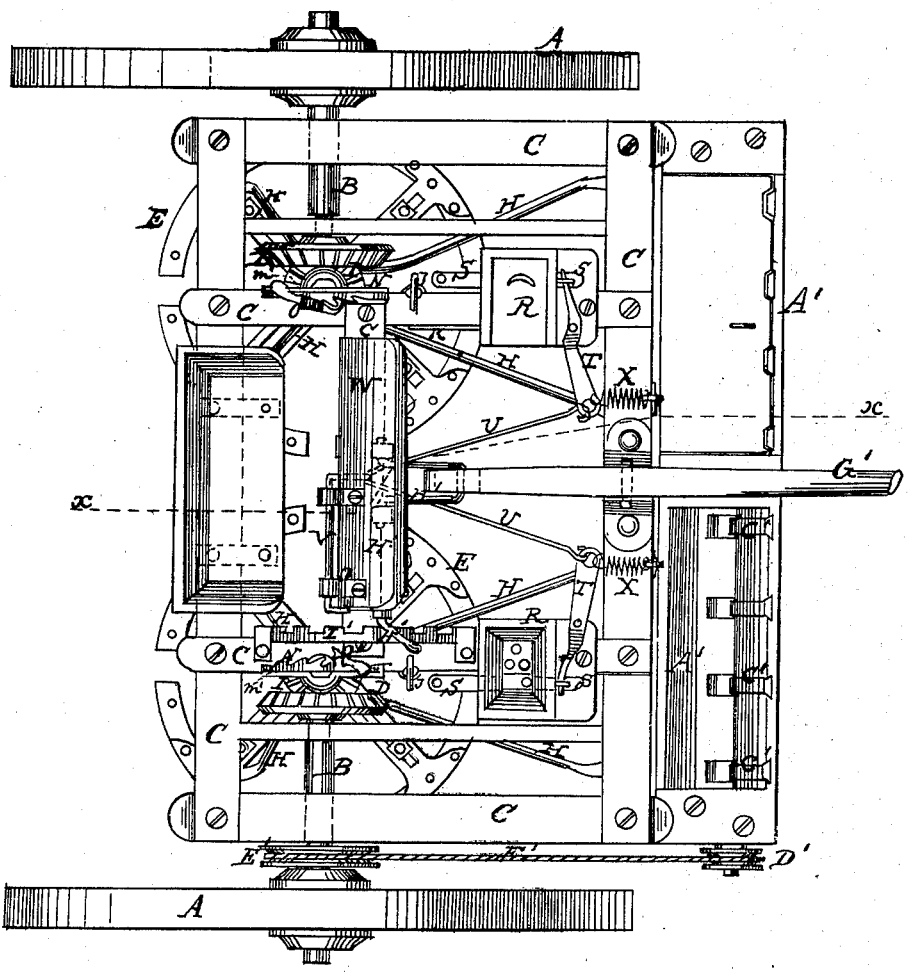
WITNESSES.
W. C. Ashkettle
Theo Tusche
INVENTOR.
W. P. Byler
per Murry
Attorneys 2 Sheets—Sheet 2.

W. P. BYLER.
COMBINED CORN PLANTER, SOWER, REVOLVING HARROW, AND CULTIVATOR.

No. 74,496.  Patented Feb. 18, 1868.

WITNESSES.

INVENTOR.
W. P. Byler
per  Attorneys

United States Patent Office.

W. P. BYLER, OF LEAVENWORTH, KANSAS.

*Letters Patent No. 74,496, dated February 18, 1868.*

---

IMPROVEMENT IN COMBINED CORN-PLANTER, SOWER, REVOLVING HARROW, AND CULTIVATOR.

---

*The Schedule referred to in these Letters Patent and making part of the same.*

---

TO ALL WHOM IT MAY CONCERN:

Be it known that I, W. P. BYLER, of Leavenworth, in the county of Leavenworth, and State of Kansas, have invented an Improved Combined Corn-Planter, Sower, Revolving Harrow, and Cultivator; and I do hereby declare that the following is a full, clear, and exact description thereof, which will enable others skilled in the art to make and use the same, reference being had to the accompanying drawings, forming part of this specification.

Figure 1 is a top or plan view of my improved machine.

Similar letters of reference indicate corresponding parts.

My invention has for its object to furnish an improved machine for planting and cultivating corn, harrowing ground, and sowing and putting in grain, which shall be simple in construction, effective in operation, and easily and quickly adjusted for one or the other of said uses; and it consists in the construction and combination of the various parts of the machine, as hereinafter more fully described.

Figure 3:
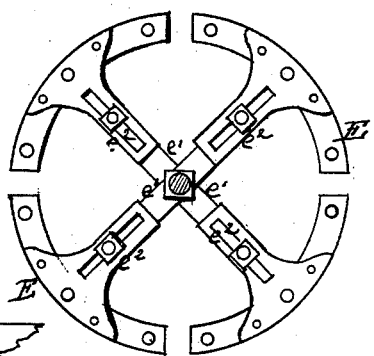
Figure 3 is a detail sectional view of the same, taken through the line $y\ y$, fig. 2.
Figure 4:
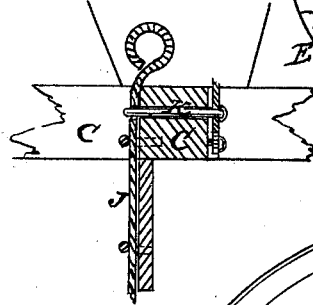
Figure 4 is a detail sectional view of the same, taken through the line $z\ z$, fig. 2.
Figure 2:
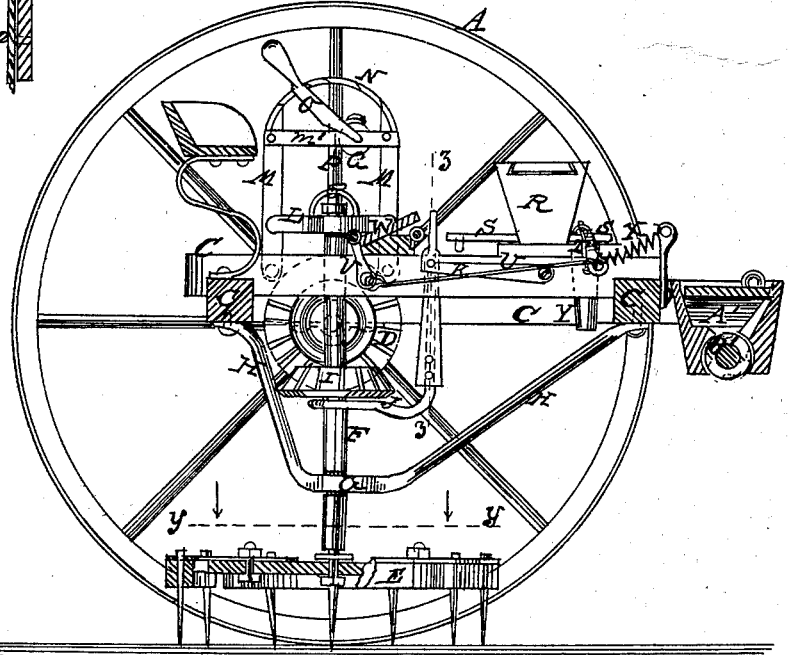
Figure 2 is a detail sectional view of the same, taken through the line $x\ x$, fig. 1.

A are the wheels of the machine, the axles B of which revolve in bearings attached to the frame C, and have bevel-gear wheels, D, attached to their inner ends, as shown in fig. 1. E are the revolving harrows, which are made in segments adjustably connected to the radial arms $e^1$, which are attached to the lower ends of the vertical shafts F by the slotted arms or plates $e^2$, as shown in fig. 2. This construction enables the two harrows to be expanded to meet or nearly meet each other for harrowing the ground and harrowing in grain, or contracted so as to leave a space between the said two harrows, enabling the machine to be used for cultivating corn or other plants planted in rows or drills. The vertical shafts F, to which the harrows E are attached, pass up through and work in the bearings G attached to the lower ends of the supports H, the upper ends of which are attached to the frame C. The shafts F have a shoulder formed upon them, which rests upon the bearings G, and prevents the said shafts from dropping down too far. The lower parts of the shafts F are rounded off, so that they may move up and down vertically through the bearings G. The middle parts of the shafts F are made square, and pass through square holes in the centres of the small bevel-gear wheels I, so that either the gear-wheel or the shaft may be moved up or down, without disturbing the other, and yet be made always to revolve together. The gear-wheels I rest upon the lower ends of the supports J, through which the shafts F pass, and their upper ends pass up through guides attached to the frame C, as shown in fig. 4, so that the said gear-wheels I may be lowered to throw them out of gear with the gear-wheels D, when desired. The supports J are secured in position when raised by the spring-catch pins K, which, when the supports J are lowered, rest against them, and when they are raised spring into holes formed in them and hold them securely in place. The upper ends of the shafts F revolve in and are swivelled to the bars L, which slide up and down upon the guides M, carrying the shafts F and harrows E with them. N is a curved rack, formed upon or attached to the upper ends of the guides M, upon the teeth of which the lever-pawl O takes hold to hold the shafts F and harrows E securely at any level to which they may be raised. P are chains, the lower ends of which are connected to the sliding bars L, and the upper ends of which are attached to the wheels or pulleys Q, which are pivoted to the cross-bars $m'$, connecting the upper parts of the guide-bars M, and to which the lever-pawls O are attached, so that, by operating the said lever-pawls, the harrows may be raised and lowered at pleasure. R are the seed-boxes for planting corn, which are placed upon and secured to the forward part of the frame C. S are slide-bars passing through the lower part of the seed-boxes R, and which have holes through them, of such a size as to hold the exact amount of seed required for a hill. The movements of the slides S are limited by stop-pins passing through them, and to their forward ends are pivoted the ends of the levers T which are pivoted to the frame C, and to their other ends are pivoted the ends of the connecting-rods U. The other ends of the connecting-rods U are attached to the lower or downwardly-projecting end of the bent or foot-lever V, which is pivoted to the foot-board W or to the frame C, and the upper end of which projects above said foot-board, and is so formed as to be conveniently operated by the driver with his foot to drop the corn. The slide-bars S are drawn back, after dropping the corn, by the coiled or equivalent springs X, which are connected with the levers T and with the frame C. From the slides S the seed passes down through the conducting-spouts Y to the planting-ploughs, which are attached to the frame C, and which are not shown in the drawings. A' is the seed-box for sowing grain, which said box is attached to suitable supports in front of and below the frame C. In the bottom of the seed-box A', in bearings attached to said box, revolves a grooved cylinder, B', through the grooves of which the grain passes out. C' are slides or gates placed in grooves in the front side of the box A', and the lower ends of which enter and fit into the grooves in the cylinder B', so that, by adjusting the said slides or gates, the amount of grain passing out may be regulated at pleasure. To one end of the cylinder B' is attached a pulley, D', around which and around the pulley E', attached to the hub or axle of one of the wheels A, passes a band, F', so that the cylinder B' may be revolved to drop the seed by the advance of the machine. By pushing the slides or gates C' low down the outflow of the seed may be wholly prevented, when desired. G' is the tongue, which is pivoted to supports attached to the upper side of the front cross-bar of the frame C. H' is a bent lever, pivoted to the central cross-bar of the frame C, and the forward projecting arm of which is pivoted to the rear end of the tongue G' by passing through a slot formed in the said rear end of the said tongue. The upwardly-projecting arm of the bent lever H' passes up at the side of the curved rack I', the teeth of which take hold of the said arm of the said lever, and hold it securely in any position in which it may be placed. This construction enables the frame C to be adjusted and held in a horizontal position or parallel with the surface of the ground, whatever may be the height of the horses or the inclination of the ground.

I claim as new, and desire to secure by Letters Patent—

1. The revolving harrows E, made adjustable, so as to be contracted and expanded, substantially as herein shown and described and for the purpose set forth.

2. The combination of the harrows E, vertical shafts F, bevel-gear wheels D and I, axles B and wheels A, with each other, substantially as herein shown and described and for the purpose set forth.

3. The combination and arrangement of the vertical shaft F, slide-bar L, chain P, pulley Q, lever-pawl O, curved rack N, and slide or guide-bars M, with each other, substantially as herein shown and described and for the purpose set forth.

4. The combination of the adjustable support J and spring-catch K with the vertical shaft F, bevel-gear wheel I, and frame C, substantially as herein shown and described and for the purpose set forth.

5. The combination and arrangement of the slide S, lever T, spring X, connecting-rod U, and bent or foot-lever V, with each other and with the seed-box R and frame C, substantially as herein shown and described and for the purpose set forth.

6. The combination of the bent lever H' and curved rack I' with the slotted end of the pivoted tongue G' and with the frame C, substantially as herein shown and described and for the purpose set forth.

W. P. BYLER.

Witnesses:
I. M. SMILEY,
CHARLES FRANKE.